US008472335B2

(12) United States Patent
De Pasquale et al.

(10) Patent No.: US 8,472,335 B2
(45) Date of Patent: Jun. 25, 2013

(54) SELECTING TRANSMISSION TECHNOLOGY FOR COMMUNICATIONS IN WIDE AREA MOBILE NETWORKS

(75) Inventors: Andrea De Pasquale, Madrid (ES); Kyriakos Exadaktylos, Madrid (ES); Esperanza Alcazar Viguera, Madrid (ES); Maria Diaz Mateos, Madrid (ES); Beatriz Garriga Muñiz, Madrid (ES); Francisco Javier Dominguez Romero, Madrid (ES); Brendan McWilliams, Madrid (ES); Julio Urbano Ruiz, Madrid (ES); Clara Serrano Solsona, Madrid (ES); Javier López Roman, Madrid (ES); Aitor García Viñas, Madrid (ES); Santiago Tenorio Sanz, Madrid (ES); Yannick Le Pezennec, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 268 days.

(21) Appl. No.: 12/836,114

(22) Filed: Jul. 14, 2010

(65) Prior Publication Data
US 2011/0085614 A1    Apr. 14, 2011

(30) Foreign Application Priority Data
Jul. 14, 2009    (ES) .................................. 200930452

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 1/02* | (2006.01) |
| *H04W 4/00* | (2009.01) |
| *H04W 72/00* | (2009.01) |
| *H03C 7/02* | (2006.01) |
| *H04B 1/02* | (2006.01) |
| *H04B 7/02* | (2006.01) |
| *H04B 1/04* | (2006.01) |
| *H04B 7/00* | (2006.01) |
| *H04B 7/10* | (2006.01) |

(52) U.S. Cl.
USPC ........... 370/252; 370/329; 370/338; 455/101; 455/104; 455/450; 455/509; 375/347

(58) Field of Classification Search
USPC .................. 370/252, 329, 338; 455/101, 104, 455/450, 509; 375/347
See application file for complete search history.

(56) References Cited

U.S. PATENT DOCUMENTS

| | | | |
|---|---|---|---|
| 2004/0063437 A1* | 4/2004 | Braun et al. ................... | 455/450 |
| 2005/0166119 A1* | 7/2005 | Park et al. ...................... | 714/749 |

(Continued)

*Primary Examiner* — Alpus H Hsu
*Assistant Examiner* — Yee Lam
(74) *Attorney, Agent, or Firm* — B. Aaron Schulman, Esq.; Stites & Harbison, PLLC (57) ABSTRACT

Method and RNC for selecting transmission technology when a UE enters the network, which checks whether the UE is MIMO and, if so and only one carrier is available, allocates its traffic to said carrier and uses a S-CPICH to provide all MIMO traffic with a diversity pilot and Virtual Antenna Mapping for balance. If more than one carrier is available, the number of UEs, their radio conditions and load of carriers are checked periodically. If the carrier is busy only with MIMO and its load is higher than the load of the remaining carriers, diversity CPICH of STTD is selected; otherwise and only if the UEs vulnerable to STTD with good radio conditions exceed a certain number, the S-CPICH is selected. The RNC can reconfigure the network from transmitting MIMO traffic with STTD to using MIMO with S-CPICH or vice versa dynamically by periodical check of the load and UEs criteria for configuration change.

10 Claims, 3 Drawing Sheets

U.S. PATENT DOCUMENTS

| | | |
|---|---|---|
| 2007/0189248 A1* | 8/2007 | Chang et al. .................. 370/338 |
| 2009/0245178 A1* | 10/2009 | Gholmieh et al. ............ 370/328 |
| 2009/0270103 A1* | 10/2009 | Pani et al. ..................... 455/436 |
| 2010/0061344 A1* | 3/2010 | Goransson et al. ........... 370/335 |
| 2010/0222059 A1* | 9/2010 | Pani et al. ..................... 455/436 |
| 2011/0149780 A1* | 6/2011 | Bollea et al. .................. 370/252 |
| 2012/0033755 A1* | 2/2012 | Ringstrom et al. ........... 375/267 |

* cited by examiner

SELECTING TRANSMISSION TECHNOLOGY FOR COMMUNICATIONS IN WIDE AREA MOBILE NETWORKS

TECHNICAL FIELD OF THE INVENTION

The present invention has its application within the telecommunications sector and, especially, in the industrial area engaged in providing Radio Network Controllers (RNCs) with traffic allocation means and policies for the different user equipments (UEs) in the Radio Access Network (RAN) of wireless communications systems. The invention relates to a method and radio network controller for selecting transmission technology for communications in wide area mobile networks.

More specifically, it relates to wireless communications systems supporting HSDPA (High Speed Downlink Packet Access) and MIMO (Multiple Input Multiple Output) technologies.

BACKGROUND OF THE INVENTION

HSDPA is a packet-based data service in the 3rd generation W-CDMA (Wideband CDMA) systems, which provides high-speed data transmission (up to 8-10 Mbps over a 5 MHz bandwidth) in CDMA to support multimedia services. This system is evolved from and backward compatible with Release 99 (Rel'99) WCDMA systems.

In order to reach higher peak rate (up to 28 Mbps at Physical layer), MIMO technology is used, in which multiple antennas are implemented at both base stations (Nodes B) and mobile terminals (UE: User Equipment).

MIMO technology is specified by the 3rd Generation Partnership Project (3GPP), which describes MIMO techniques which are considered as 3G mobile standard techniques.

MIMO terminals have to coexist with other 'legacy' terminals: i.e. terminals that comply only with earlier releases of the 3GPP standards such as Rel'99 and HSDPA terminals.

MIMO terminals are a special category of the HSDPA terminals, but for simplicity here HSDPA terminals refers to terminals supporting HSDPA but not supporting MIMO technology.

The 3GPP classifies HSDPA mobile terminals into 18 categories according to their data transmission capability, as listed in Table 1 (The TTI refers to the minimum transmission time interval which is allocated to the mobile terminal for receiving data.

The values in the Table 1 indicate HSDPA categories specified in 3GPP Release 7 (additional categories have been specified in Release 8).

TABLE 1

| HS-DSCH category | Maximum number of HS DSCH codes received | Minimum inter-TTI interval | Maximum number of bits of an HS-DSCH transport block received within an HS-DSCH TTI | Total number of soft channel bits | Supported modulations without MIMO operation | Supported modulations simultaneous with MIMO operation |
|---|---|---|---|---|---|---|
| Category 1 | 5 | 3 | 7298 | 19200 | QPSK, 16QAM | (MIMO not supported) |
| Category 2 | 5 | 3 | 7298 | 28800 | | (MIMO not supported) |
| Category 3 | 5 | 2 | 7298 | 28800 | | (MIMO not supported) |
| Category 4 | 5 | 2 | 7298 | 38400 | | (MIMO not supported) |
| Category 5 | 5 | 1 | 7298 | 57600 | | (MIMO not supported) |
| Category 6 | 5 | 1 | 7298 | 67200 | | (MIMO not supported) |
| Category 7 | 10 | 1 | 14411 | 115200 | | (MIMO not supported) |
| Category 8 | 10 | 1 | 14411 | 134400 | | (MIMO not supported) |
| Category 9 | 15 | 1 | 20251 | 172800 | | (MIMO not supported) |
| Category 10 | 15 | 1 | 27952 | 172800 | | (MIMO not supported) |
| Category 11 | 5 | 2 | 3630 | 14400 | QPSK | (MIMO not supported) |
| Category 12 | 5 | 1 | 3630 | 28800 | | (MIMO not supported) |
| Category 13 | 15 | 1 | 35280 | 259200 | QPSK, 16QAM, 64QAM | (MIMO not supported) |
| Category 14 | 15 | 1 | 42192 | 259200 | | (MIMO not supported) |
| Category 15 | 15 | 1 | 23370 | 345600 | | QPSK, 16QAM |
| Category 16 | 15 | 1 | 27952 | 345600 | | |
| Category 17 | 15 | 1 | 35280 | 259200 | QPSK, 16QAM, 64QAM | — |
| | | | 23370 | 345600 | — | QPSK, 16QAM |

TABLE 1-continued

| HS-DSCH category | Maximum number of HS DSCH codes received | Minimum inter-TTI interval | Maximum number of bits of an HS-DSCH transport block received within an HS-DSCH TTI | Total number of soft channel bits | Supported modulations without MIMO operation | Supported modulations simultaneous with MIMO operation |
|---|---|---|---|---|---|---|
| Category 18 | 15 | 1 | 42192 | 259200 | QPSK, 16QAM, 64QAM | — |
|  |  |  | 27952 | 345600 | — | QPSK, 16QAM |

At the transmitter of MIMO terminals and Nodes B, the information bits are divided into several bit streams and transmitted through different antennas. The transmitted information are recovered from the received signals at multiple receive antennas by using an advanced receiver.

Commonly, in MIMO systems, two parallel data flows at the same transmission power are simultaneously transmitted in the downlink (DL) from two Power Amplifiers (PAs).

The receiver is able to determine which transmitter antenna the received signal comes from, provided different pilots are used per each PA.

There are two ways specified by the 3GPP in order to guarantee that different pilots are used, i.e. that there is "PA diversity": one is to transmit the Primary Common Pilot Channel (P-CPICH) on one of the two power amplifiers (PA1) and a Diversity P-CPICH on the other one (PA2); another option is to transmit the P-CPICH on PA1 but to send a Secondary Common Pilot Channel (S-CPICH) from PA2.

An efficient usage of Radio Resources when MIMO is activated in the system requires that both PAs utilize the same amount of power even when non-MIMO traffic is present. This is called power amplifier balancing.

In order to ensure PA balancing, MIMO is coupled with the activation of Transmit Diversity modes for all the channels transmitted on a cell (i.e., to be used when transmitting data to existing Rel'99 and legacy HSDPA terminals):

Space time transmit diversity (STTD) utilizes space-time block code (STBC) in order to exploit redundancy in multiply transmitted versions of a signal, that is, the two antennas transmit the same information but each one uses a different coding scheme.

Time-switched transmit diversity (TSTD) uses the information fed back to the transmitter, which decides which one of is antennas is used to transmit each time, and the receiver checks the quality each transmitter antenna (transmitting alternatively) is received with.

Closed-loop feedback transmit diversity (CLTD) applies a weight W by which one of the two antennas is rotated with respect to the other one, so that coherent combination is achieved at the UE antenna input and the same data stream are transmitted on both antennas without any coding.

The support of the aforementioned Diversity Techniques is specified as mandatory for all user equipment (UE). A dedicated channel being transmitted in any transmit diversity mode may convey the same data, but the transmissions from the two antennas carry a different pilot signal (over a so-called Diversity Common Pilot Channel).

There are other possible approaches to grant power balancing: One solution consists of using an additional carrier (having available one carrier on the first PA and a second carrier on a second PA) paired with a load balancing between carriers. Another way is the Virtual Antenna Mapping described below.

UTRA MIMO Extension 25.876, version 1.80 specifies several transmission mode proposals intended for application with HSDPA, including the so called "MIMO with Virtual Antenna mapping" which adaptively selects the number of antennas from which to transmit as well as selects the best subset of antennas for the selected transmission mode. Virtual Antenna mapping improves the balance of the transmission powers from the two PAs in the low SNR (signal to noise ratio) region. MIMO with Virtual Antenna mapping does not require Diversity CPICH but uses the S-CPICH (Secondary Common Pilot Channel) defined in the UTRAN.

Overall, in the context of this invention, Virtual Antenna mapping refers to any technology implemented before the PAs (usually the baseband) which is able to split the signals intelligently across PAs so that the transmission powers from the PAs are balanced.

In summary, MIMO transmission needs the usage of two PAs and the availability of a diversity pilot (one per each PA), which can be provided by the usage of either a Diversity CPICH (with STTD transmission mode) or a S-CPICH (with Virtual Antenna mapping).

It is also useful to consider the introduction of future technologies in the 3GPP: 3GPP Rel'8 has defined a Dual Carrier feature in which the UE can receive data from two adjacent carriers. The standardization of Dual Carrier requires that transmit diversity is either used in both carriers or in none of them.

Utilization of STTD as a Diversity Technique has been chosen by the 3GPP as the main technique to be used together with MIMO.

However, some trial measurements carried in field by mobile network operators have shown that the STTD activation significantly decreases the performance of some categories of legacy HSDPA terminals already in the market, particularly those ones of category 7 or category 8, when the terminals are operating in both good and medium radio conditions. Performances in good radio conditions are precisely those that allow reaching the highest peak rates offered by the mobile network operators.

The aforementioned problem is linked to the fact that the HSDPA UEs of categories 7 and 8 use a Type 2 receiver (single receiving antenna and equalizer) or a Type 3 receiver (dual receiving×antenna and equalizer), in order to boost the DL peak rate in good radio conditions, but the utilization of STTD with these family or receivers provokes an associated peak rate performance lower than the case in which STTD is not used.

This calls for a solution in order to manage the allocation of the diverse terminals across different and possible configurations.

SUMMARY OF THE INVENTION

The present invention serves to solve the aforesaid problem by providing means for a radio network controller (RNC) to select a transmission technology for communications with the different user equipments (MIMO UEs, HSDPA UEs and non-HSDPA or Rel'99 UEs) that can coexist in a wide area mobile network different supporting capabilities for HSDPA and MIMO technologies. This invention allows the RNC to establish several radio carrier configurations for a MIMO system to work and dynamically activates one of them when at least one MIMO UE enters into the network. For these purposes, the load of traffic from the UEs on the carriers, and the number and the type of UEs existing in the network are taken into account by the RNC in the moment of the change.

The selection of the carrier configuration with certain transmission technology (including transmit diversity or not) is network based and aims to avoid the allocation of some HSDPA terminals to a radio carrier in which transmit diversity by STTD is currently used as well as maximizing the system performances.

This goal is achieved by either using a configuration in which STTD is not used (an S-CPICH for diversity is used instead), or by carefully managing the allocation of some UEs to the carrier where STTD is used.

The invention defines two basic configurations that determine the transmission technologies to be used when MIMO is enabled during a time period for a certain network scenario:

A) Network configuration in which STTD is used by at least one carrier: STTD provides diversity pilot (Diversity CPICH) for the MIMO system and, at the same time, power balancing between the two power amplifiers involved in MIMO transmission. If a plurality of radio carriers exists, the power balancing is created by using Virtual Antenna Mapping for transmission mode of traffic on at least a second carrier (Virtual Antenna Mapping approach is out of scope of this invention).

When this Configuration is in use, or when the system is evaluating the possibility to activate or switch to Configuration A from Configuration B, the following definitions apply:

HSDPA UEs are defined by the operator as vulnerable to STTD according to their UE category; such a definition is flexible and can be changed via parameter by an operator. As an example here, standardized categories 1, 2, 3, 4, 5, 11 and 12 are defined as non-vulnerable to STTD, corresponding categories 6, 7, 8, 9, 10, 13 and 14 to UEs which are vulnerable to STTD.

In addition, the RNC takes into account the radio conditions in which each UE is working to decide the network configuration switch. Radio conditions are determined according to measurements of certain parameters: the received signal code power (RSCP) and energy per chip to noise density ratio (Ec/No), which are available at RNC level, and channel quality indicator (CQI), available at NodeB level and which can be made available at the RNC by sending a periodical average measurement across the IuB from the NodeB to the RNC. Radio conditions are evaluated by the RNC at call set-up as well as periodically during the call, in order to optimize the matching between carrier loads and Experienced Radio conditions. The radio conditions measurements are compared to quality thresholds, configurable by operator, in order to determine in which quality range of radio conditions the UE is currently operating. In the context of the present invention, Good/Medium/Bad radio conditions can be distinguished.

In this configuration, the HSDPA UEs that are vulnerable to STTD that are in Good Radio conditions are allocated on a radio carrier in which STTD is neither used nor needed.

B) Network configuration in which the diversity for MIMO is created by using a S-CPICH (Secondary CPICH) and the power balancing is kept by using Virtual Antenna Mapping (out of scope of this invention).

When MIMO Transmission is not used, an additional configuration is possible in the network:

Configuration 0, a network configuration in which the traffic is handled over a single PA and the Pilot used is the Primary CPICH.

In order to switch from Configuration 0 (non MIMO) to any of Configuration A or B (MIMO activated), the steps followed are:

When there are no MIMO users in the network, there is no need to transmit diversity. However, when a MIMO user enters the system with a call, the network is reconfigured so that the transmission can be performed from the two power amplifiers involved in MIMO. In the latter case, there can be two network scenarios: only one radio carrier is available to allocate all traffic including traffic load from MIMO UEs or a plurality of carriers is provided for traffic allocation. Therefore, the RNC decides as follows:

In the case of one single carrier, the RNC selects or changes to Configuration B (MIMO with S-CPICH).

If two or more radio carriers are allowed, the mobile network operator decides through a network parameter if the RNC reconfigures to option A (MIMO with STTD) or B (MIMO without STTD and with S-CPICH). In case that the Configuration B is selected by the operator as the default configuration, the Virtual Mapping function is activated by the RNC on every carrier so that all the existing traffic (on all the carriers) is spread (power balanced) across two power amplifiers (PA1, PA2). In the network configuration B, the S-CPICH is switched-on on PA2 so that the MIMO transmission can finally start. If Configuration A (MIMO using STTD) is selected by the operator as the default configuration, all the existing Rel'99 traffic is moved (through interfrequency handover by the RNC) to a radio carrier in which STTD is not used and the scheduling of the HSDPA traffic is temporarily stopped waiting for STTD to become active on the carrier assigned to MIMO traffic.

Whatever Configuration with more than one carrier is used, the RNC in communication with the UE (which can be MIMO, HSDPA or non-HSDPA type) decides on a connection basis (at call set-up and during the call) which radio carrier is used by each type of terminal, following a Radio Resource Management (RRM) policy (out of the scope of this invention).

Once having the network configured according to any of the described MIMO network configurations (Configuration A or B), switching from Configuration A to B or vice versa can be carried out as follows:

The invention allows the network operator to automatically move from Configuration A to Configuration B and vice versa. This dynamically reconfiguration is desirable due to the fact that Configuration B has the drawback to use a S-CPICH that consumes an amount of power that cannot be used for traffic and this implies interference in the system for all the non-MIMO terminals, whilst Configuration A does limit the flexibility of the system to allocate HSDPA terminals on all the available carriers and this is not efficient in certain conditions.

The RNC ensures that there is not any ping pong effect when switching from one configuration to the other by ensuring that changes can only be triggered if at least a pre-defined time interval (e.g., with a 5 minutes granularity, from 5 minutes to 24 hours) have passed from the last configuration change.

The switch from Configuration A to B is performed by the RNC as follows:

In case the dynamic Configuration Change is allowed, the RNC checks periodically (every x minutes) if pre-defined Configuration Change criteria are met.

A first criterion is that the following two conditions are met:
- the average number of HSDPA UEs that are vulnerable to STTD and with Good Radio performances that are currently carried on f1 (the carrier in which STTD is not used) is higher than N,
- the average transmission power (Load) on f2 (carrier with STTD) plus a first Delta Load (this Delta Load can assume positive or negative values) is lower or equal than the average transmission power (Load) on f1 (assuming f2 is the carrier with STTD and f1 the remaining carrier without STTD).

If the first criteria is not met, a second criteria is checked. This second criteria can be any of the following criteria or a combination and or a comparison of them:
- whether Dual Carrier technology can be activated
- whether Dual Carrier technology can be activated together with MIMO in the same NodeB,
- Dual Carrier activation can trigger a system configuration change
- no additional carrier (f3) is available (i.e., the traffic from all MIMO users are carried on f2 with STTD and power balancing with f1 is carried out by Virtual Antenna Mapping),
- The number and the average number of Dual Carrier-capable HSDPA terminals that are in the cell.
- The number and the average number of MIMO terminals in the cell If the first or the second criteria or both are met, the RNC prepares the system for switching to configuration B. During X minutes, all incoming Rel'99 calls are preferably directed to f1 (i.e. as long as f1 load allows to allocate calls) and after said X minutes, all remaining Rel'99 calls that are still on f2 are handed over (inter-frequency HO) by the RNC from f2 to f1.

The handovers can be executed at the same time, or can be distributed across a time span of T1 seconds The Configuration is changed from A to B.

In order to change from Configuration B to A, the RNC checks periodically if a Configuration Change criterion is met. This can be made, for example by meeting a first and a second Configuration Change Criteria:

The first Configuration criterion can be any of the following criteria or a combination and/or comparison of them:
- The number and the average number of MIMO users on f2
- The number and the average number of HSDPA users Vulnerable to STTD on Carrier f2
- The number and the average number of HSDPA users Vulnerable to STTD on Carrier f1
- The average load on f2 plus a second Delta Load is higher than the one on f1

If the first Configuration change criterion is met, a second criterion is checked. The second Configuration change criterion can be any of the following criteria or a combination of them:
- whether Dual Carrier technology can be activated in the NodeB
- whether Dual Carrier technology can be activated together with MIMO in the same NodeB,
- Dual Carrier activation can prevent a system configuration change
- no additional carrier (f3) is available (i.e., the traffic from all MIMO users are carried on f2 with STTD and power balancing with f1 is carried out by Virtual Antenna Mapping)
- Dual Carrier transmission is currently used in the cell by any UEs
- the number and the average number of Dual Carrier-capable HSDPA terminals that are in the cell
- the number and the average number of MIMO users on f2

If the first and the second criteria are both met, the RNC prepares the system for switching to configuration A.

If non-MIMO users are occupying a carrier in which STTD can be used when changing from Configuration B to A, the RNC has to move the HSDPA users vulnerable to STTD having Good Radio conditions into carrier f1 (the carrier not using STTD) and also wait for X minutes before carrying out the change, so that some Rel'99 calls can end and move the remaining ongoing Rel'99 calls that are on f2 to f1.

The handovers can be executed at the same time, or can be distributed across a time span of T2 seconds.

An aspect of the invention refers to a method for selecting a transmission technology (either non-MIMO configuration 0, either MIMO configuration A or B) in a network where MIMO, HSDPA and non-HSDPA UEs can coexist, which comprises the following steps:

First, checking by the RNC whether the UE entering the network (a call from said UE arrives to the RNC) is MIMO capable.

If only one carrier is available to allocate the traffic of the incoming UE, MIMO traffic is by default transmitted by selecting a S-CPICH for diversity pilot and Virtual Antenna Mapping for transmit diversity (configuration B).

If more than one carriers are available, the traffic of the MIMO UE is allocated to one radio carrier assigned to MIMO traffic and the RNC performs periodically measurements of radio conditions of the UEs, measurements of load of each radio carrier and checking of the number of the different types of UEs. In the case that the assigned carrier allocates only MIMO traffic and if the measured load of said radio carrier is higher than a specific threshold (delta load) and at the same time is higher than the measured load of the remaining carriers (free of MIMO traffic), the diversity CPICH provided by STTD (configuration A) is selected to transmit diversity pilot for MIMO. When the UEs vulnerable to STTD working in good radio conditions (i.e., their radio condition parameters are higher than a quality threshold) which coexist in the network overpass a certain number and the load of the carrier with MIMO is lower or equal than the load of the carriers free of MIMO traffic, a S-CPICH is selected to provide MIMO diversity (configuration B).

If the previous criteria are not met and if a plurality of radio carriers is available, STTD is used only on one single radio carrier, allocating all existing MIMO traffic to said one radio carrier and allocating all existing non MIMO traffic to another radio carrier not using STTD.

Another aspect of the invention deals with a radio network controller (RNC) comprising processing means for performing the method described before.

A last aspect of the invention deals with a computer program comprising program code means which execute the method described before, when loaded into processing means of the radio network controller defined above.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

Figure 1:
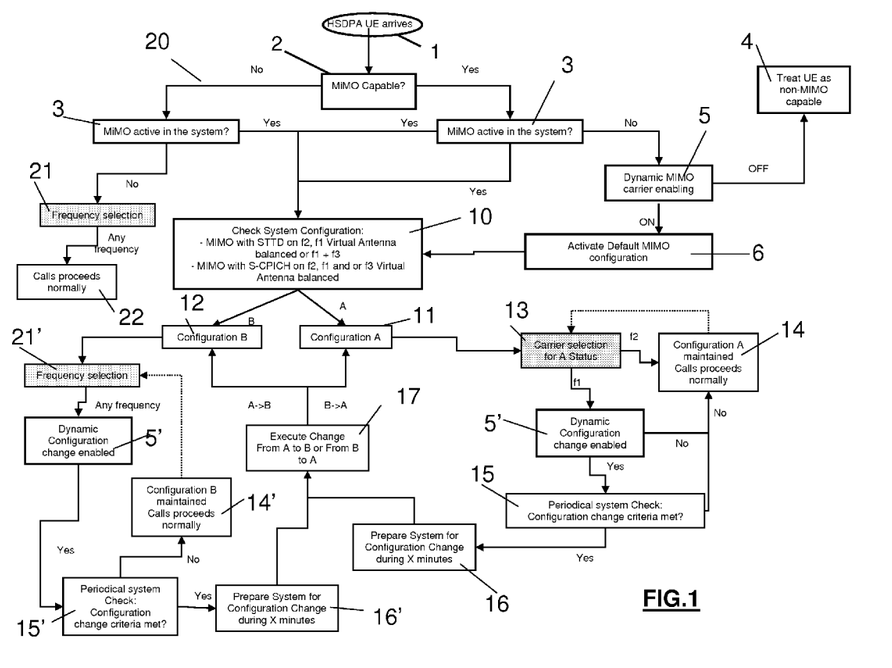
FIG. 1.—It shows a flow chart of the selection of transmission technology in a mobile network supporting MIMO and up to three radio carriers, according to a preferred embodiment of the invention.
Figure 2:
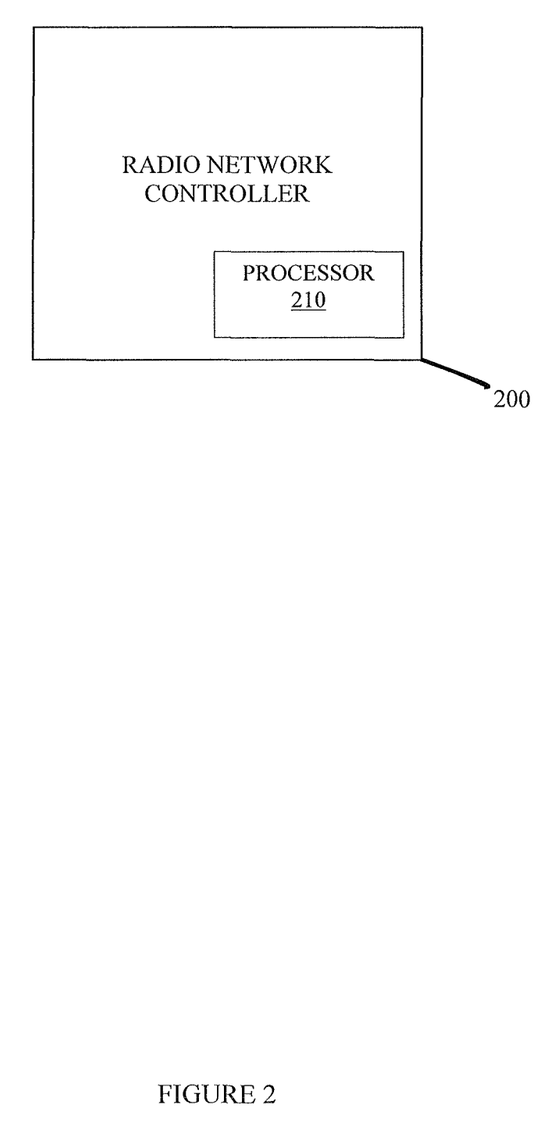
FIG. 2 is a schematic showing a radio network controller having a processor which implements the method of FIG. 1.
Figure 3:
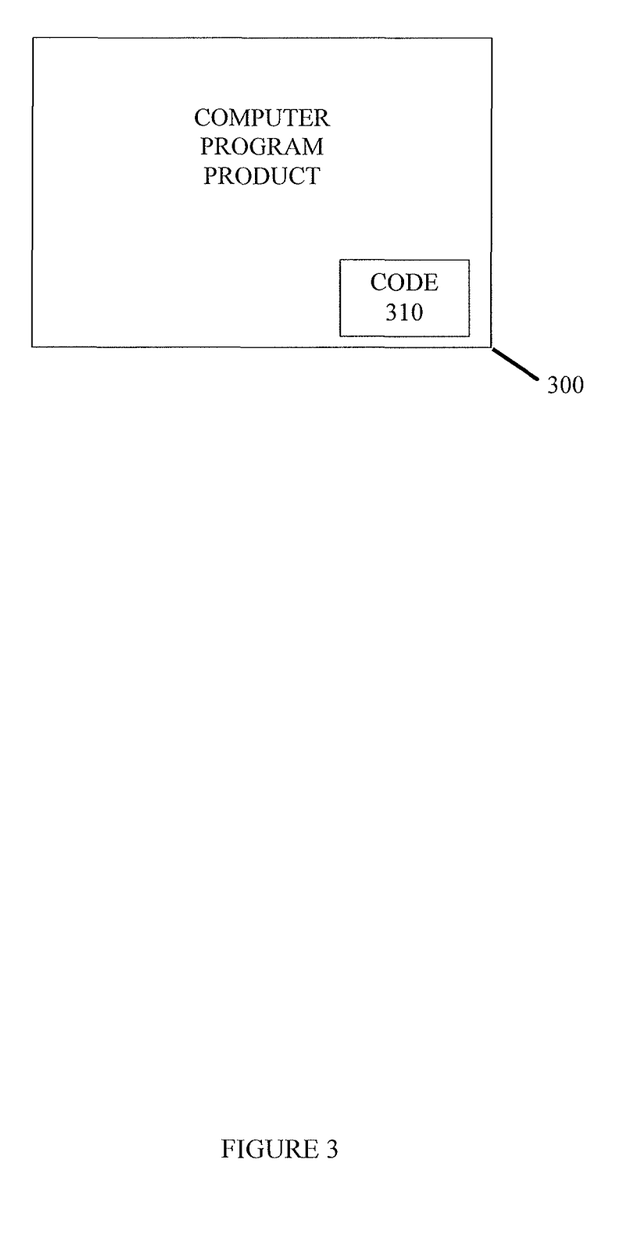
FIG. 3 is a schematic showing a computer program product having code for implementing the method of FIG. 1.

Assume a network scenario in which different User Equipments supporting MIMO, HSDPA or Rel'99 can coexist. In such scenario, different network configurations are defined for traffic allocation when a User Equipment enters with a call. FIG. 1 shows a flow chart of a selection of transmission in a mobile network supporting MIMO and up to three radio carriers. FIG. 2 shows a high level, schematic of a radio network controller (RNC) having a processor 210 which can be used for implementing the method of FIG. 1. FIG. 3 shows a computer program product 300 which has computer code 310 for use in implementing the method of FIG. 1.

The RNC 200 selects the network configuration at call set-up and during the call and the selection depends on the type of the incoming UE and a series of conditions found by this UE when entering the network. Since MIMO UEs can access to the network, a default MIMO network configuration is defined. The possible MIMO network configurations are:

Configuration A1: Two radio carriers, f1 and f2. STTD used on f2. MIMO users allocated to carrier f2. Carrier f1 free of MIMO traffic, traffic load on f1 balanced with Virtual Antenna Mapping.

Configuration A2: Three radio carriers, f1, f2 and f3. STTD used on f2. MIMO users allocated to carrier f2. Carriers f1 and f3 free of MIMO traffic, traffic load is assigned to f1 and f3 so that relative load between f1 and f3 is balanced.

Configuration B1: One single carrier f1. Virtual Antenna Mapping used. MIMO and all traffic allocated to the carrier f1. S-CPICH used to provide diversity for MIMO.

Configuration B2: Two carriers, f1 and f2. Virtual Antenna Mapping used. All MIMO traffic allocated to f2. The remaining classes of traffic are allocated between f1 and f2, with Virtual Antenna Mapping for balancing. S-CPICH used on f2 to provide diversity for MIMO.

When a HSDPA UE arrives 1 to the RNC 200, checking of its MIMO capabilities 2 is performed. If the UE supports MIMO, the RNC 200 checks whether a MIMO network configuration is already activated 3. If no MIMO network configuration is active in the network and no dynamic MIMO carrier is enabled at the RNC, the HSDPA UE is treated as NON-MIMO capable 4. Dynamic MIMO carrier enabling 5 allows activation of a default MIMO configuration 6.

Also, HSDPA UEs not supporting MIMO can arrive at the network with a new call 20 and, if MIMO is deactivated, the RNC 200 uses a typical frequency selection algorithm 21, for example, based on load of the carriers. Once allocated the call traffic to the selected carrier, the RNC processes the call normally 22.

Having a MIMO network configuration activated 10, the transmission technology used can be either MIMO with STTD 11 (i.e., configurations A1 or A2, commonly called configuration A) either MIMO with S-CPICH 12 (i.e., configurations B1 or B2, commonly called configuration B).

If MIMO with STTD 11 (configuration A) is active, the RNC 200 selects from f2 and f1 (or f3) a radio carrier for traffic allocation 13. If the carrier with STTD, f2, is selected, the call proceeds normally with this configuration A unchanged 14 until a determined period, of X minutes, when the RNC checks whether a configuration change is needed. If any of the carriers free from MIMO traffic, f1 or f3, allocates the traffic, the RNC 200 can perform periodically checking of the criteria for configuration change 15 (from configuration A to any configuration B; i.e., switching from MIMO diversity with STTD to MIMO with S-CPICH), in case that dynamic carrier is enabled 5'; otherwise, the call proceeds normally 14.

If MIMO with S-CPICH 12 (configuration B) is active, the RNC 200 applies the frequency selection algorithm 21' used for traffic allocation to any of the available carrier, for example, in accordance to their load. In case that dynamic carrier is enabled 5', the RNC 200 periodically checks whether the criteria for configuration switching 15' from configuration B to configuration A (change to MIMO diversity with STTD) are met. While the network goes on using configuration B, the call is processed normally 14' by the RNC 200. When the criteria for configuration change, 15 or 15', are met, the RNC 200 switches the technique used for MIMO diversity, from using diversity pilot of STTD to the usage of a S-CPICH or vice versa.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for selecting a transmission technology for communications in a wide area mobile network which provides at least one available radio carrier for allocating traffic of coexisting Multiple Input Multiple Output (MIMO) User Equipments, High Speed Downlink Packet Access (HSDPA) User Equipments and non-High Speed Downlink Packet Access (non-HSDPA) User Equipments, said method comprising:

checking whether the User Equipment is a MIMO User Equipment;

if the User Equipment is a MIMO User Equipment and one single radio carrier is available, allocating the traffic of the User Equipment to the single radio carrier and selecting a Secondary Common Pilot Channel (S-CPICH) to provide all MIMO traffic with a diversity pilot and Virtual Antenna Mapping for transmit diversity;

if the User Equipment is a MIMO User Equipment and a plurality of radio carriers is available, allocating the traffic of the User Equipment to one radio carrier to which all existing MIMO traffic are already allocated and periodically determining a number of User Equipments coexisting in the network, measuring radio condition parameters of the User Equipment and measuring an average transmission power load of each radio carrier, and if said one radio carrier is occupied only by MIMO traffic and the average transmission power load of said one radio carrier is higher than a specific threshold and higher than the average transmission power load of the remaining radio carriers free of MIMO traffic, selecting a diversity Common Pilot Channel (CPICH) which uses Space time transmit diversity (STTD) to provide all existing MIMO traffic with a diversity pilot;

if the average transmission power load of said one radio carrier is lower than or equal to the average transmission power load of the remaining radio carriers free of MIMO traffic and the number of User Equipments with radio condition measurements higher than a quality threshold and with an HSDPA standardized category of HSDPA User Equipment identified by the operator as being vulnerable to STTD exceeds a certain number, selecting a S-CPICH to provide all MIMO traffic with a diversity pilot and Virtual Antenna Mapping for transmit diversity;

otherwise, selecting a diversity CPICH which uses STTD to provide all existing MIMO traffic with a diversity pilot and if a plurality of radio carriers is available, further comprising:

using STTD on only one radio carrier, allocating all existing MIMO traffic to said one radio carrier and allocating all existing non MIMO traffic to another radio carrier not using STTD.

2. The method according to claim 1, further comprising checking periodically whether Dual Carrier technology is activated.

3. The method according to claim 2, wherein, if Dual Carrier technology is activated and a diversity CPICH which uses STTD is selected, when a User Equipment enters the network, deactivating STTD and selecting a S-CPICH to provide all MIMO traffic with a diversity pilot and Virtual Antenna Mapping for transmit diversity.

4. The method according to claim 2, wherein, if Dual Carrier technology is activated and a S-CPICH to provide all MIMO traffic with a diversity pilot is selected, when a User Equipment enters the network, activating STTD and selecting the diversity CPICH used by STTD to provide all existing MIMO traffic with a diversity pilot.

5. The method according to claim 1, wherein if a diversity CPICH which uses STTD is selected, when a User Equipment enters the network, deactivating STTD and selecting a S-CPICH to provide all MIMO traffic with a diversity pilot and Virtual Antenna Mapping for transmit diversity only if a change criterion is met, being the change criterion selected from a number of MIMO User Equipments in a cell, a number of HSDPA User Equipments supporting Dual Carrier in a cell and a combination of both criteria.

6. The method according to claim 1, wherein if a S-CPICH to provide all MIMO traffic with a diversity pilot is selected, when a User Equipment enters the network, activating STTD and selecting the diversity CPICH used by STTD only if a change criterion is met, being the change criterion selected from a number of MIMO User Equipments allocated to one carrier, a number of HSDPA User Equipments allocated to any carrier belonging to the HSPDA standardized category of HSDPA User Equipment identified by the operator as being vulnerable to STTD, a number of HSDPA User Equipments supporting Dual Carrier in a cell and a combination of them.

7. The method according to claim 1, wherein the HSPDA standardized category of HSDPA User Equipment corresponding to being vulnerable to STTD is selected from the group consisting of standardized categories 6, 7, 8 , 9 and 10 as specified by the $3^{rd}$ Generation Partnership Project (3GPP).

8. The method according to claim 1, wherein the radio condition parameters are: received signal code power (RSCP), energy per chip to noise density ratio (Ec/No) and channel quality indicator (CQI).

9. A method performed by a radio network controller for selecting a transmission technology for communications in a wide area mobile network which provides at least one available radio carrier for allocating traffic of coexisting Multiple Input Multiple Output (MIMO) User Equipments, High Speed Downlink Packet Access (HSDPA) User Equipments and non-High Speed Downlink Packet Access (non-HSDPA) User Equipments, said method comprising:

checking whether the User Equipment is a MIMO User Equipment;

if the User Equipment is a MIMO User Equipment and one single radio carrier is available, allocating the traffic of the User Equipment to the single radio carrier and selecting a Secondary Common Pilot Channel (S-CPICH) to provide all MIMO traffic with a diversity pilot and Virtual Antenna Mapping for transmit diversity;

if the User Equipment is a MIMO User Equipment and a plurality of radio carriers is available, allocating the traffic of the User Equipment to one radio carrier to which all existing MIMO traffic are already allocated and periodically determining a number of User Equipments coexisting in the network, measuring radio condition parameters of the User Equipment and measuring an average transmission power load of each radio carrier, and if said one radio carrier is occupied only by MIMO traffic and the average transmission power load of said one radio carrier is higher than a specific threshold and higher than the average transmission power load of the remaining radio carriers free of MIMO traffic, selecting a diversity Common Pilot Channel (CPICH) which uses Space time transmit diversity (STTD) to provide all existing MIMO traffic with a diversity pilot;

if the average transmission power load of said one radio carrier is lower or equal than the average transmission power load of the remaining radio carriers free of MIMO traffic and the number of User Equipments with radio condition measurements higher than a quality threshold and with an HSPDA standardized category of HSDPA User Equipment identified by the operator as being vulnerable to STTD exceeds a certain number, selecting a S-CPICH to provide all MIMO traffic with a diversity pilot and Virtual Antenna Mapping for transmit diversity;

otherwise, selecting a diversity CPICH which uses STTD to provide all existing MIMO traffic with a diversity pilot and if a plurality of radio carriers is available, further comprising:

using STTD on only one radio carrier, allocating all existing MIMO traffic to said one radio carrier and allocating all existing non MIMO traffic to another radio carrier not using STTD.

10. A computer program product comprising non-transitory computer readable medium comprising program code which, executed by a processor, performs a method for selecting a transmission technology for communications in a wide area mobile network which provides at least one available radio carrier for allocating traffic of coexisting Multiple Input Multiple Output (MIMO) User Equipments, High Speed Downlink Packet Access (HSDPA) User Equipments and High Speed Downlink Packet Access (non-HSDPA) User Equipments, said method comprising:

checking whether the User Equipment is a MIMO User Equipment;

if the User Equipment is a MIMO User Equipment and one single radio carrier is available, allocating the traffic of the User Equipment to the single radio carrier and selecting a Secondary Common Pilot Channel (S-CPICH) to provide all MIMO traffic with a diversity pilot and Virtual Antenna Mapping for transmit diversity;

if the User Equipment is a MIMO User Equipment and a plurality of radio carriers is available, allocating the traffic of the User Equipment to one radio carrier to which all existing MIMO traffic are already allocated and periodically determining a number of User Equipments coexisting in the network, measuring radio condition parameters of the User Equipment and measuring an average transmission power load of each radio carrier, and if said one radio carrier is occupied only by MIMO traffic and the average transmission power load of said one radio carrier is higher than a specific threshold and higher than the average transmission power load of the remaining radio carriers free of MIMO traffic, selecting a diversity Common Pilot Channel (CPICH) which uses Space time transmit diversity (STTD) to provide all existing MIMO traffic with a diversity pilot;

if the average transmission power load of said one radio carrier is lower or equal than the average transmission power load of the remaining radio carriers free of MIMO traffic and the number of User Equipments with radio condition measurements higher than a quality threshold and with an HSPDA standardized category of HSDPA User Equipment identified by the operator as being vulnerable to STTD exceeds a certain number, selecting a S-CPICH to provide all MIMO traffic with a diversity pilot and Virtual Antenna Mapping for transmit diversity;

otherwise, selecting a diversity CPICH which uses STTD to provide all existing MIMO traffic with a diversity pilot and if a plurality of radio carriers is available, further comprising:

using STTD on only one radio carrier, allocating all existing MIMO traffic to said one radio carrier and allocating all existing non MIMO traffic to another radio carrier not using STTD.

* * * * *